United States Patent
Chen

(10) Patent No.: US 11,700,148 B2
(45) Date of Patent: Jul. 11, 2023

(54) PACKET TRANSMISSION METHOD AND DEVICE, AND COMPUTER STORAGE MEDIUM

(71) Applicant: ZTE Corporation, Shenzhen (CN)

(72) Inventor: Lei Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 234 days.

(21) Appl. No.: 17/271,860

(22) PCT Filed: Aug. 30, 2019

(86) PCT No.: PCT/CN2019/103814
§ 371 (c)(1),
(2) Date: Feb. 26, 2021

(87) PCT Pub. No.: WO2020/043201
PCT Pub. Date: Mar. 5, 2020

(65) Prior Publication Data
US 2021/0320819 A1     Oct. 14, 2021

(30) Foreign Application Priority Data
Aug. 31, 2018   (CN) .......................... 201811010331.8

(51) Int. Cl.
*H04L 12/46* (2006.01)
*H04L 45/745* (2022.01)
*H04L 69/08* (2022.01)

(52) U.S. Cl.
CPC ...... *H04L 12/4633* (2013.01); *H04L 12/4641* (2013.01); *H04L 45/745* (2013.01); *H04L 69/08* (2013.01); *H04L 2212/00* (2013.01)

(58) Field of Classification Search
None
See application file for complete search history.

(56) References Cited

U.S. PATENT DOCUMENTS

2018/0013511 A1    1/2018  Hussain
2019/0319829 A1*  10/2019  Li ....................... H04L 41/0893

FOREIGN PATENT DOCUMENTS

| CN | 101188534 A | 5/2008 |
| CN | 102546669 A | 7/2012 |
| CN | 106357421 A | 1/2017 |
| EP | 3013017 A1  | 4/2016 |

(Continued)

OTHER PUBLICATIONS

Indian Office Action for corresponding application 202117014745; Report dated Nov. 22, 2022.

(Continued)

*Primary Examiner* — Christine T Duong
(74) *Attorney, Agent, or Firm* — Cantor Colburn LLP

(57) ABSTRACT

Provided are a packet transmission method and device and a computer storage medium. The method includes: a FlexE shim receives an Ethernet packet forwarded by a switching module and sent by a processor, the FlexE shim being located between a PHY layer and a MAC layer, and the switching module including a data link layer and a network layer; and the FlexE shim converts the Ethernet packet into a PPP packet, codes the PPP packet, and then inserts the PPP packet into a FlexE overhead of a target FlexE port for transmission.

20 Claims, 10 Drawing Sheets

(56) References Cited

FOREIGN PATENT DOCUMENTS

| EP | 3306839 A1 | 4/2018 |
| WO | 2007113645 A2 | 10/2007 |
| WO | 2014153784 A1 | 10/2014 |
| WO | 2017070851 A1 | 5/2017 |
| WO | WO-2017070851 A1 * | 5/2017 |

OTHER PUBLICATIONS

Eira, A. et al., "On the Efficiency of Flexible Ethernet Client Archtechtures in Optical Transport Networks [Invited]", IEE, vol. 10, No. (1), Jan. 31, 2018.
International Search Report for corresponding application PCT/CN2019/103814 filed Aug. 30, 2019; dated Nov. 28, 2019.

* cited by examiner

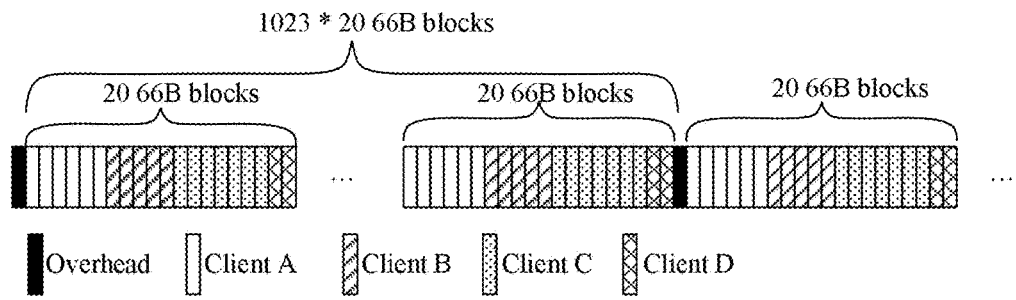
Fig. 1
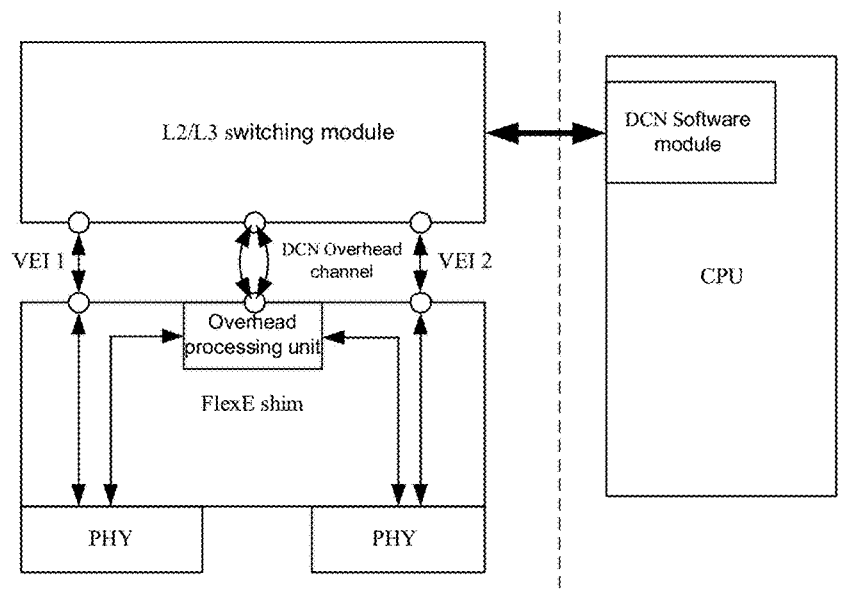
Fig. 2
Fig. 3

PACKET TRANSMISSION METHOD AND DEVICE, AND COMPUTER STORAGE MEDIUM

CROSS-REFERENCE TO RELATED APPLICATIONS

The present disclosure claims priority to Chinese Patent Application No. 201811010331.8, filed to the China Patent Office on Aug. 31, 2018, the disclosure of which is hereby incorporated by reference in its entirety.

TECHNICAL FIELD

The present disclosure relates to the field of communication.

BACKGROUND

A Data Communicate Network (DCN) provides a low-cost and convenient device management network for telecom operators, which is widely used in a Packet Transmit Network (PTN) of telecom operators. In the PTN, the DCN shares the same physical topology with a service switching network, and the traffic of the DCN needs to be forwarded in three layers hop by hop. In addition, the DCN is isolated from the service switching network by a Virtual Local Area Network (VLAN) technology and a Virtual Route Forwarding (VRF) technology.

With the development of mobile communication technology, from the 2-Generation wireless telephone technology (2G), the 3rd-Generation (3G), the 4th Generation mobile communication technology (4G), pre the 5th Generation mobile communication technology (Pre 5G), and then to the future 5G, the user data traffic rapidly increases, and the network interface rate of a packet transmission device (i.e. PTN device) also develops from 1G, 10G to the current 100G. The Flexible-Ethernet (FlexE) technology, published officially by the International Organization for Standardization-Optical Internet Forum (OIF) in 2016, separates a logical layer and a physical layer of the service, supports the binding of multiple Ethernet Physical (PHY) ports through a FlexE Group to transmit large-traffic Ethernet services, and realizes the large-rate, sub-rate and channelized functions of the logical layer.

The FlexE technology only defines the basic underlying pipelines available for FlexE devices and network managers, and does not provide a set of perfect mechanisms to achieve how FlexE devices transmit DCN packets.

SUMMARY

Embodiments of the present disclosure provide a packet transmission method and device, and a computer storage medium.

The packet transmission method provided by the embodiments of the present disclosure includes:

a FlexE shim receives an Ethernet packet forwarded by a switching module and sent by a processor, the FlexE shim being located between a PHY layer and a Media Access Control (MAC) layer, and the switching module including a data link layer and a network layer;

the FlexE shim converts the Ethernet packet into a Point-to-Point Protocol (PPP) packet, codes the PPP packet, and then inserts the PPP packet into a FlexE overhead of a target FlexE port for transmission.

The packet transmission method provided by the embodiments of the present disclosure includes:

a FlexE shim extracts data from a FlexE overhead of a target FlexE port, and decodes the data to obtain a PPP packet, the FlexE shim being located between a PHY layer and an MAC layer;

the FlexE shim converts the PPP packet into an Ethernet packet, and sends the Ethernet packet to a switching module so that the switching module forwards the Ethernet packet to a processor or a FlexE shim corresponding to a port different from the target FlexE port, the switching module including a data link layer and a network layer.

The packet transmission method provided by the embodiments of the present disclosure includes:

a FlexE shim extracts data from a FlexE overhead of a first FlexE port, and decodes the data to obtain a DCN packet, the FlexE shim being located between a PHY layer and an MAC layer;

the FlexE shim sends the DCN packet to a switching module through a first Virtual Ethernet Interface (VEI) so that the switching module forwards the DCN packet to a processor based on a L3 routing table or forwards the DCN packet to the FlexE shim through a second VEI, and the FlexE shim codes the DCN packet, and then inserts the DCN packet into a FlexE overhead of a second FlexE port for transmission, the switching module including a data link layer and a network layer.

The packet transmission device provided by the embodiments of the present disclosure includes: a FlexE shim, a switching module and a processor.

The FlexE shim is configured to receive an Ethernet packet forwarded by the switching module and sent by the processor, convert the Ethernet packet into a PPP packet, code the PPP packet, and then insert the PPP packet into a FlexE overhead of a target FlexE port for transmission, the FlexE shim being located between a PHY layer and an MAC layer, the switching module including a data link layer and a network layer.

The packet transmission device provided by the embodiments of the present disclosure includes: a FlexE shim, a switching module and a processor.

The FlexE shim is configured to extract data from a FlexE overhead of a target FlexE port, decode the data to obtain a PPP packet, convert the PPP packet into an Ethernet packet, and send the Ethernet packet to the switching module, the FlexE shim being located between a PHY layer and an MAC layer. The switching module is configured to forward the Ethernet packet to the processor or a FlexE shim corresponding to a port different from the target FlexE port. The switching module includes a data link layer and a network layer.

The packet transmission device provided by the embodiments of the present disclosure includes: a FlexE shim, a switching module and a processor.

The FlexE shim is configured to extract data from a FlexE overhead of a first FlexE port, decode the data to obtain a DCN packet, and send the DCN packet to the switching module through a first VEI, the FlexE shim being located between a PHY layer and an MAC layer. The switching module is configured to forward the DCN packet to the processor based on a L3 routing table or forward the DCN packet to the FlexE shim through a second VEI. The FlexE shim is further configured to code the DCN packet, and then insert the DCN packet into a FlexE overhead of a second FlexE port for transmission. The switching module includes a data link layer and a network layer.

BRIEF DESCRIPTION OF THE DRAWINGS

FIG. 1 is a schematic diagram of FlexE channelized time slot transmission of client services;

FIG. 2 is a schematic diagram of a FlexE overhead multi-frame structure;

FIG. 3 is a schematic structure composition diagram of a packet transmission device according to an embodiment of the present disclosure;

FIG. 4-1 is a schematic flowchart of a packet transmission method according to an embodiment of the present disclosure;

FIG. 4-2 is a schematic diagram of packet format conversion according to an embodiment of the present disclosure;

FIG. 5-1 is a schematic flowchart of another packet transmission method according to an embodiment of the present disclosure;

FIG. 5-2 is a schematic diagram of another packet format conversion according to an embodiment of the present disclosure;

FIG. 6-1 is a schematic flowchart of yet another packet transmission method according to an embodiment of the present disclosure;

FIG. 6-2 is a schematic diagram of a DCN overhead port and a VLAN sub-interface in a switching module according to an embodiment of the present disclosure;

FIG. 8-1 is a schematic diagram of data transmission between two devices in Example 1 of the present disclosure;

FIG. 8-2 is a schematic diagram of DCN convenient opening packet format conversion in Example 1 of the present disclosure;

FIG. 8-3 is a schematic diagram of another DCN convenient opening packet format conversion in Example 1 of the present disclosure;

FIG. 13-1 is a schematic diagram of a sending direction data processing process of a FlexE background client-based DCN channel according to Example 4 of the present disclosure;

FIG. 13-2 is a schematic diagram of a receiving direction data processing process of a FlexE background client-based DCN channel according to Example 4 of the present disclosure;

DETAILED DESCRIPTION OF THE EMBODIMENTS

Figures 1, 4:
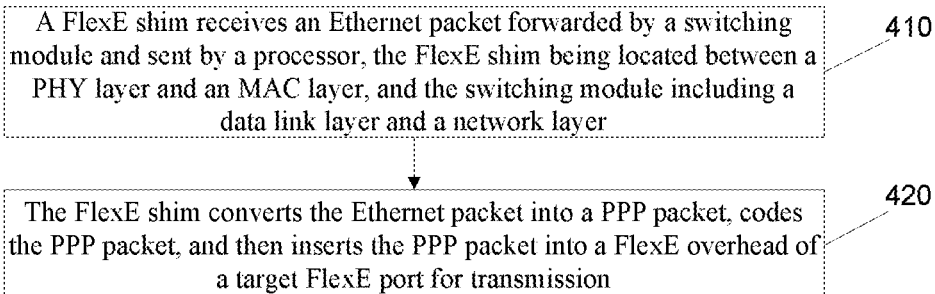

The FlexE differs structurally from the traditional Ethernet in that a FlexE Shim is inserted between an MAC sublayer and a Physical Coding sublayer (PCS). As shown in FIG. 1, the function of the shim is to construct a Calendar with the size of 20*n 66-bit blocks (hereinafter referred to as 66B blocks). For a 100G PHY (i.e., an Ethernet PHY with a network interface rate of 100G), each 66B block represents a 5G time slot, and n represents the number of Ethernet PHYs bound by a FlexE Group. On a multiplexing side, signals of clients are inserted into time slots at designated positions according to multiples of 5G, time slot information of different clients is transmitted by a FlexE overhead, the FlexE overhead uses a multi-frame structure (as shown in FIG. 2), one overhead block is inserted into each FlexE PHY at a fixed interval of 20*1023 66B blocks, and 8 overhead blocks form a complete FlexE overhead frame.

Figures 2, 4:
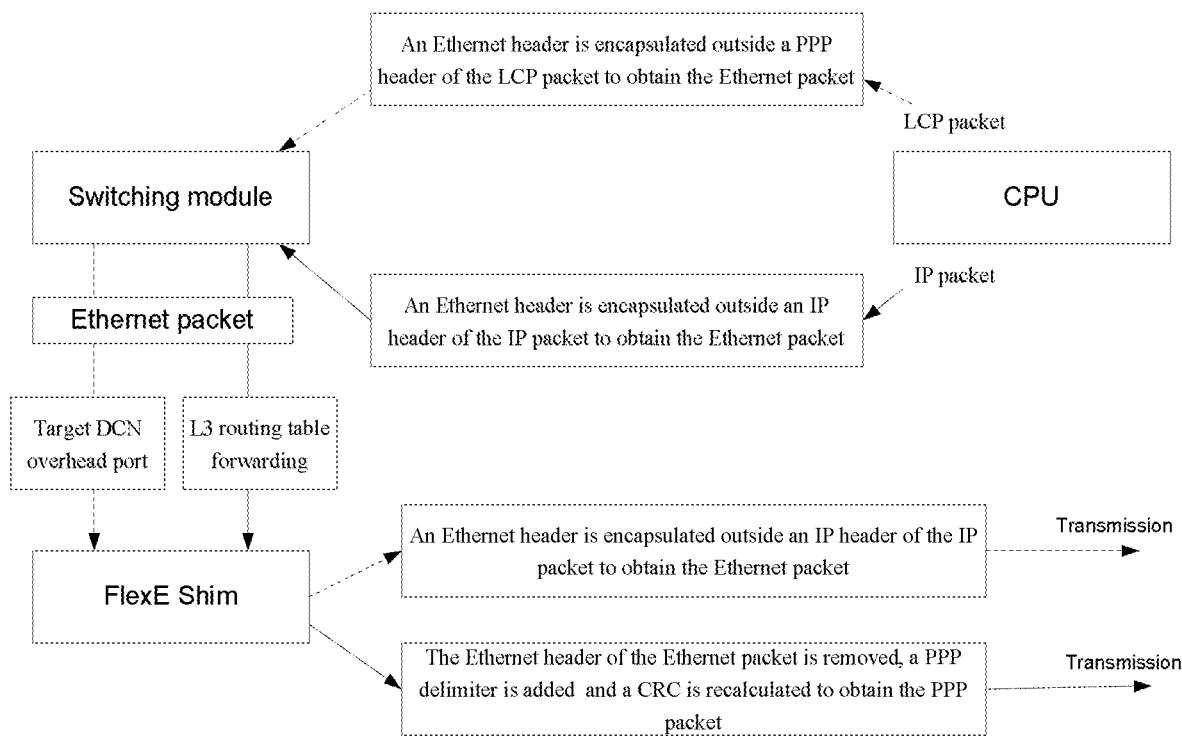

The FlexE overhead frame structure is shown in FIG. 2: the FlexE overhead frame defines two levels of manager channels: a manager channel of a section (i.e., Manager channel-section) and a manager channel of Shim-to-Shim (i.e., Manager channel-shim to shim). The bytes of Manager channel-section are 16 bytes in rows 4 and 5, and the manager channel bandwidth of Section is 1.260 Mb/s. The Manager channel-section information terminates at a section of adjacency, is valid only between adjacent physical pipelines, and does not penetrate the third party network. The bytes of Manager channel-shim to shim are 24 bytes in rows 6, 7 and 8, and the manager channel bandwidth of Shim-to-Shim is 1.890 Mb/s. The Manager channel-shim to shim is valid between two adjacent Shims. In an Aware scenario, the Manager channel-shim to shim penetrates the third party network.

A traditional Ethernet DCN technology works only on normal Ethernet ports and does not work properly on special FlexE technology-enabled Ethernet ports (referred to as FlexE ports in the following embodiments). The FlexE technology, as a time division multiplexing hardware pipeline technology, has a small bandwidth rate of a manager channel reserved in overhead. With the increasing number of 5G network devices and the gradual application of a Software Defined Network (SDN) technology in the future, the bandwidth traffic needed by network management and operation maintenance between FlexE devices and network managers and between FlexE devices and SDN controllers must be increased. The DCN network bandwidth should be improved on the basis of PTN bearer devices.

The FlexE technology only defines the basic underlying pipelines available for FlexE devices and network managers, and does not provide a set of perfect mechanisms to achieve how FlexE devices transmit DCN packets. Aiming at the problem, the embodiments of the present disclosure provide a packet transmission method and device based on a FlexE device. In a FlexE overhead manager channel, a PPP protocol is used for transmitting a DCN packet; or, the DCN packet is transmitted using a 66b block in a FlexE service time slot.

In order to facilitate the understanding of the technical solutions of the embodiments of the present disclosure, the structure and function of the packet transmission device of the embodiments of the present disclosure will be described first.

Figures 1, 8:
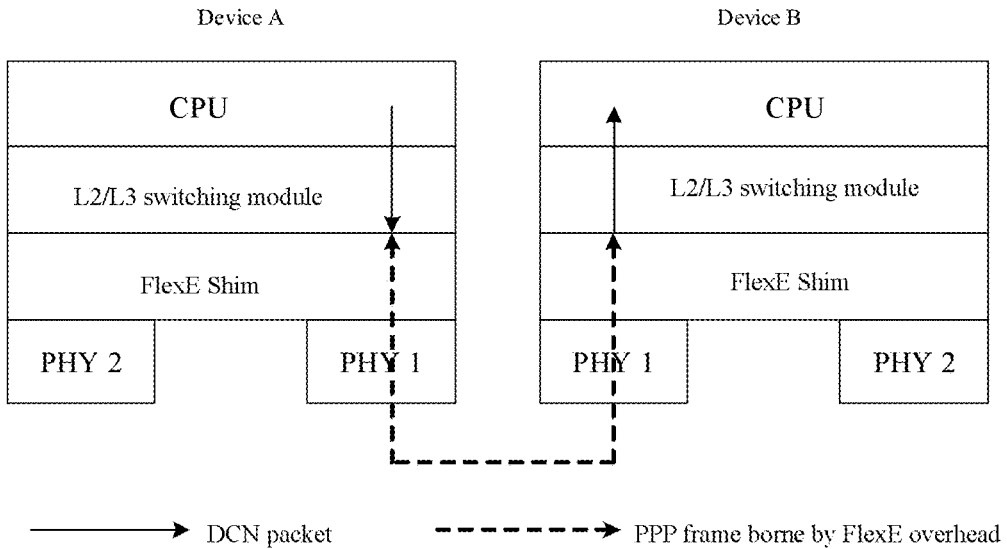
Figures 2, 8:
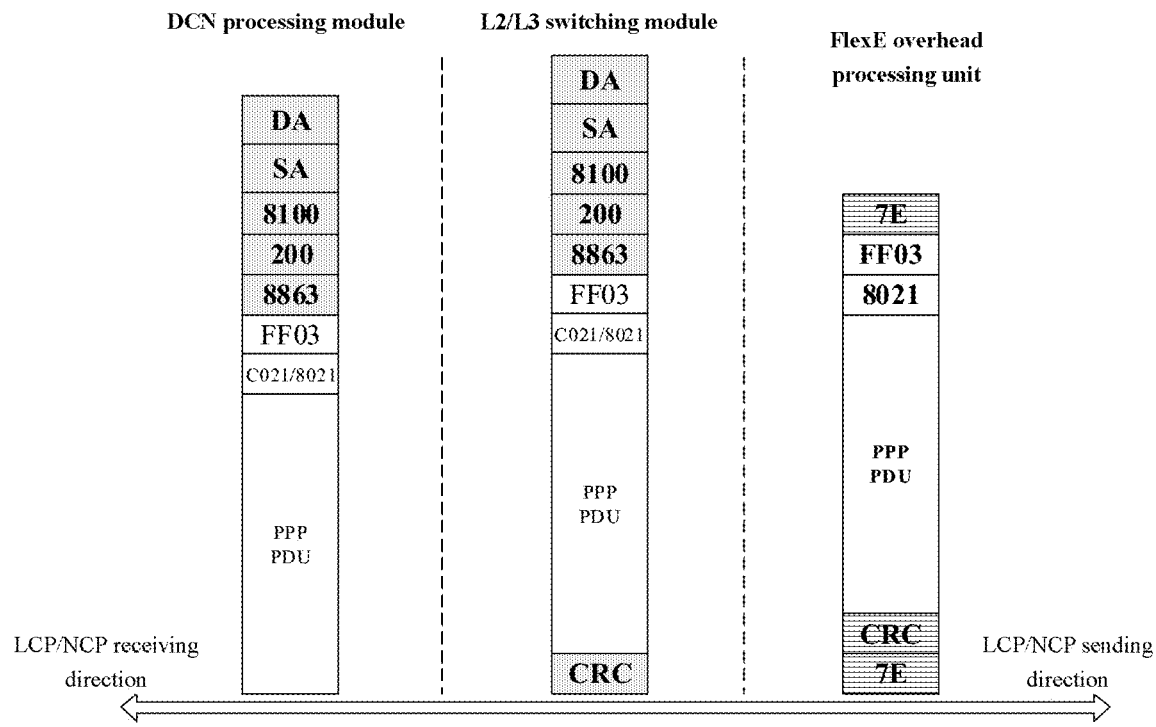
Figures 3, 8:
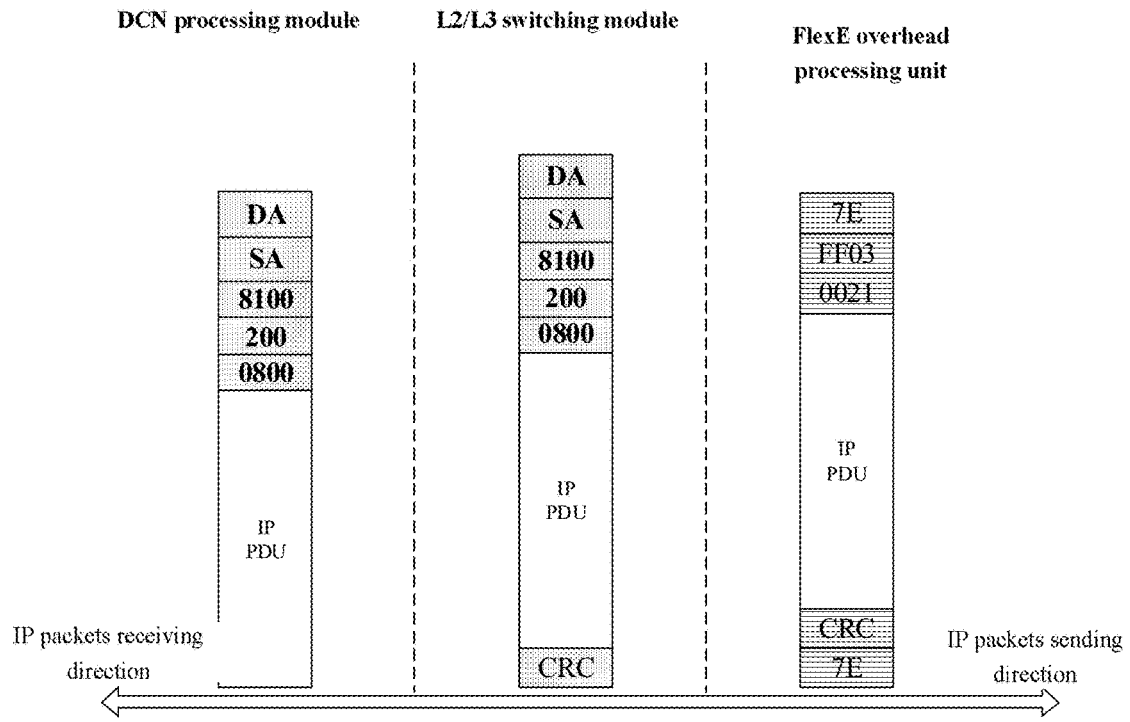

As shown in FIG. 3, the packet transmission device in the embodiments of the present disclosure consists of three parts: a FlexE shim, an L2/L3 switching module (referred to as a switching module for short) and a DCN software module (referred to as a processor for short):

1) The FlexE shim is responsible for completing service data time slot mapping and overhead processing defined by an OIF FlexE standard, an overhead processing unit being configured to convert an encapsulation format of a DCN convenient opening packet.

2) The switching module is responsible for extracting a DCN packet and performing L3 forwarding on the DCN packet.

3) The processor is responsible for the protocol processing and logic control required to create a DCN forwarding channel.

The processor is disposed on a Central Processing Unit (CPU), and the FlexE shim and the switching module may be integrated on the same hardware chip or may be separately disposed on different hardware chips, such as an Application Specific Integrated Circuit (ASIC) switching chip or a Field Programmable Gate Array (FPGA). When the DCN packet is transmitted among the three modules, the DCN packet is encapsulated into an Ethernet format.

In implementation, the processor on the CPU automatically generates a DCN virtual interface according to a FlexE port (that is, a special Ethernet port supporting the FlexE technology) after the device is powered on, and enables PPP and Open Shortest Path First (OSPF) network protocols. Each DCN virtual interface represents a logical DCN data channel and is mapped to a particular DCN overhead port or VLAN sub-interface of the DCN overhead port on the switching module. 1) The DCN virtual interface supports a PPP protocol, and establishes a point-to-point connection on a pair of DCN virtual interfaces between devices through a Link Control Protocol (LCP)/Network Control Protocol (NCP). 2) At a network layer, the DCN virtual interface starts an OSPF protocol according to preset OSPF parameters, calculates an OSPF route of the DCN, and writes a routing table into the switching module. The processor is not in direct communication with the FlexE shim, and all data are transferred through the switching module. When the processor sends a DCN data packet to the switching module, an LCP/NCP protocol packet of a PPP is encapsulated into an Ethernet format: an Ethernet header is encapsulated outside a PPP header, and is directly sent to the FlexE shim from a designated DCN overhead port without L3 forwarding. However, for Internet Protocol (IP) over PPP packets (including OSPF over PPP), after the PPP header is removed, an IP payload is encapsulated in a newly added Ethernet header and sent to the switching module, and IP data packets may be forwarded in a L3 routing table or directly sent out of a designated port. The switching module may be regarded as a traditional two-layer and L3 forwarding chip, supports L3 routing forwarding of DCN IP packets, performs Access Control List (ACL) rule matching on DCN protocol packets and sends the DCN protocol packets to the CPU. At least one DCN overhead port is arranged between the switching module and the FlexE shim and configured to receive or send Ethernet frames from the FlexE shim. DCN overhead ports distinguish data traffic on different DCN channels by creating multiple VLAN sub-interfaces.

The FlexE shim is responsible for completing service data time slot mapping and overhead processing defined by an FlexE standard, and an overhead processing unit in the module is the core responsible for processing DCN data. In a receiving direction, the overhead processing unit organizes 66b blocks in FlexE overhead section or shim-to-shim into a PPP format packet, converts the PPP format packet into an Ethernet format according to a conversion rule, and sends the PPP format packet to L2/L3 for processing. In the sending direction, the overhead processing unit converts an Ethernet packet received from L2/L3 into a PPP packet, and inserts the PPP packet into an overhead of FlexE after 66-bit coding.

Two connecting channels are arranged between the switching module and the FlexE shim: a DCN overhead channel connected to the overhead processing unit on the FlexE shim, used for supporting conveniently opened DCN packet forwarding; and a VEI that supports client service landing to a local switching module for supporting DCN packet forwarding with greater bandwidth transmission rates.

FIG. 4-1 is a schematic flowchart of a packet transmission method according to an embodiment of the present disclosure. As shown in FIG. 4-1, the packet transmission method includes step 410 to step 420.

In step 410, a FlexE shim receives an Ethernet packet forwarded by a switching module and sent by a processor, the FlexE shim being located between a PHY layer and an MAC layer, and the switching module including a data link layer and a network layer.

In the embodiments of the present disclosure, the Ethernet packet sent by the processor includes two types, referring to FIG. 4-2:

1) If a DCN packet required to be forwarded by the processor is an LCP packet, the Ethernet packet sent by the processor is generated by the processor in the following manner.

An LCP packet is acquired, and an Ethernet header is encapsulated outside a PPP header of the LCP packet to obtain the Ethernet packet (i.e. the Ethernet packet is a packet obtained by encapsulating the Ethernet header outside the PPP header of the acquired LCP packet).

In this case, the FlexE shim receives an Ethernet packet directly forwarded by the switching module through a target DCN overhead port.

2) If a DCN packet required to be forwarded by the processor is an IP packet, the Ethernet packet sent by the processor is generated by the processor in the following manner:

An IP packet is acquired, and an Ethernet header is encapsulated outside an IP header of the IP packet to obtain the Ethernet packet (i.e. the Ethernet packet is a packet obtained by encapsulating the Ethernet header outside the IP header of the acquired IP packet).

In this case, the FlexE shim receives an Ethernet packet forwarded by the switching module based on a L3 routing table, or the FlexE shim receives an Ethernet packet directly forwarded by the switching module through a target DCN overhead port.

In the embodiments of the present disclosure, the switching module includes at least one DCN overhead port, each DCN overhead port includes at least one VLAN sub-interface, different VLAN sub-interfaces correspond to different data channels, and the data channels are DCN channels or client service channels.

Correspondingly, the Ethernet packet carries first identification information, the first identification information is at least one of the following: DCN overhead port information and VLAN sub-interface information, and the first identification information is used to identify a DCN channel corresponding to the Ethernet packet. For example, the first identification information is DCN overhead port information, and the DCN overhead port information and the DCN channel have one-to-one correspondence, so that the corresponding DCN channel may be determined based on the DCN overhead port information. For another example, the first identification information is VLAN sub-interface information, and the VLAN sub-interface information and the DCN channel have one-to-one correspondence, so that the corresponding DCN channel may be determined based on the VLAN sub-interface information. For another example, the first identification information is DCN overhead port information and VLAN sub-interface information, one piece of DCN overhead port information and one piece of VLAN sub-interface information correspond to one DCN channel, and the corresponding DCN channel may be determined based on the DCN overhead port information and the VLAN sub-interface information.

In step 420, the FlexE shim converts the Ethernet packet into a PPP packet, codes the PPP packet, and then inserts the PPP packet into a FlexE overhead of a target FlexE port for transmission.

According to the technical solution of the embodiments of the present disclosure, a set of perfect mechanism is provided to realize the forwarding of DCN packets by a FlexE device. Therefore, two different DCN packet forwarding technologies are provided, one technology is to use PPP to transmit DCN packets in a manager channel of a FlexE overhead, and the other technology is to use FlexE service time slots to transmit DCN packets so that the potential for greater transmission bandwidth rates can be achieved.

In the embodiments of the present disclosure, referring to FIG. 4-2, two different modes for converting an Ethernet packet into a PPP packet are respectively as follows:

1) The FlexE shim removes the Ethernet header of the Ethernet packet, adds a PPP delimiter, and recalculates a Cyclic Redundancy Check (CRC) to obtain the PPP packet.

For example, the FlexE shim converts a packet received from the switching module, converts a packet format into a PPP packet, sends the PPP packet to a corresponding FlexE port according to a VLAN identifier of an Ethernet header, and sends the PPP packet out through a manager channel in a FlexE frame structure.

If Ether_TYPE=0x8863 or 0x8864, it indicates that the packet main body is a PPP protocol packet, and only the outer layer of the packet needs to be stripped: DA, SA, 8100, vlan, Ether_TYPE, and CRC in the original packet are stripped, only the contents of a Protocol Data Unit (PDU) part are reserved, the reserved contents are almost a complete PPP packet, and when the PPP packet is encapsulated, only a PPP delimiter 0x7E needs to be added and a CRC needs to be recalculated.

2) The FlexE shim extracts an IP payload from the Ethernet packet, adds a PPP delimiter and a PPP header to the IP payload, and recalculates a CRC to obtain the PPP packet.

If Ether_TYPE=0x0800, it indicates that the packet belongs to an IP packet, and the processing process is as follows: DA, SA, 8100, vlan, Ether_TYPE, and CRC in the original packet are stripped, the content of the reserved PDU part is processed and then encapsulated into a PPP packet, and a protocol domain type of the PPP packet is filled into 0021.

In addition, if the vlan flag indicates that the packet belongs to a manager channel packet, but the Ether_TYPE is not 0x0800, 0x8863 and 0x8864, the packet format does not meet the requirements and is directly discarded.

In the embodiments of the present disclosure, when converting the Ethernet packet into a PPP packet, the FlexE shim extracts the first identification information from the Ethernet packet. The FlexE shim determines a DCN channel corresponding to the Ethernet packet according to the first identification information, and determines the target FlexE port according to the DCN channel corresponding to the Ethernet packet. The FlexE shim performs 64-bit or 66-bit coding on the PPP packet, and then inserts the PPP packet into a manager channel of the FlexE overhead of the target FlexE port for transmission.

Figures 1, 5:
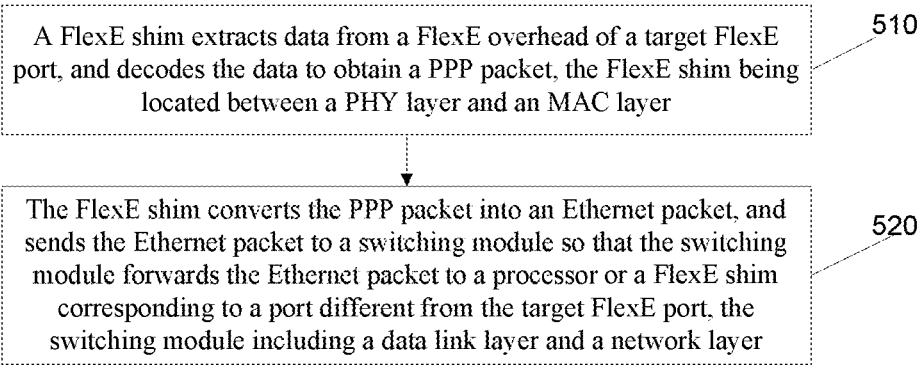
Figures 2, 5:
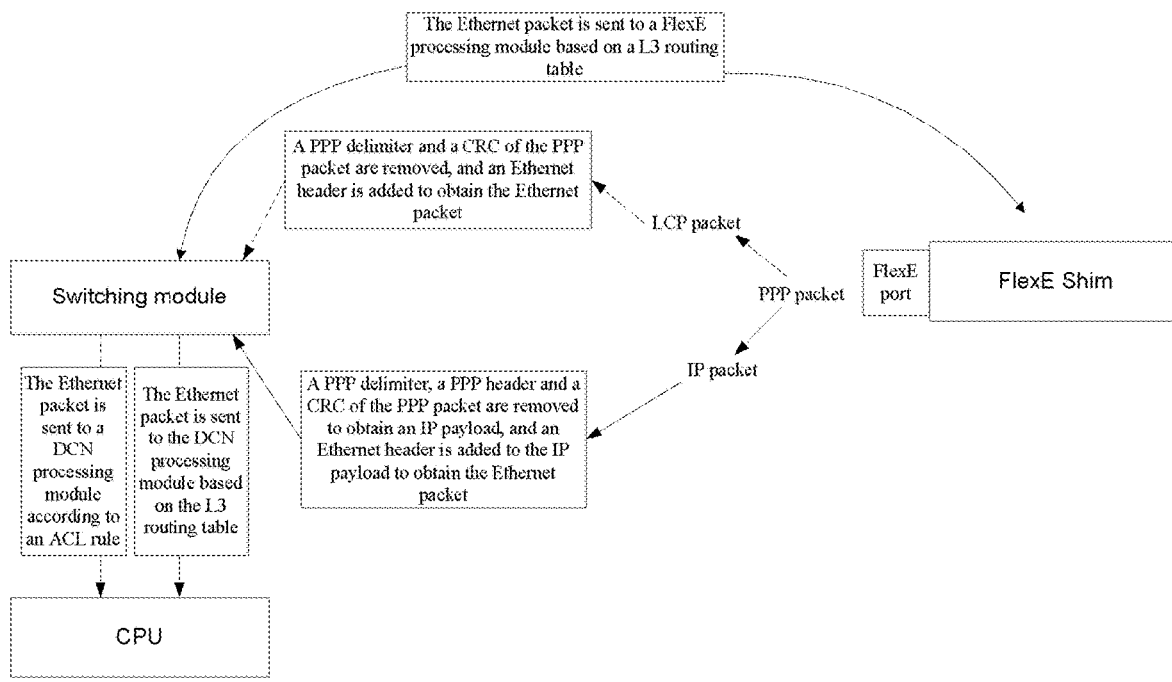

FIG. 5-1 is a schematic flowchart of another packet transmission method according to an embodiment of the present disclosure. As shown in FIG. 5-1, the packet transmission method includes step 510 to step 520.

In step 510, a FlexE shim extracts data from a FlexE overhead of a target FlexE port, and decodes the data to obtain a PPP packet, the FlexE shim being located between a PHY layer and an MAC layer.

In step 520, the FlexE shim converts the PPP packet into an Ethernet packet, and sends the Ethernet packet to a switching module so that the switching module forwards the Ethernet packet to a processor or a FlexE shim corresponding to a port different from the target FlexE port, the switching module including a data link layer and a network layer.

In the embodiments of the present disclosure, the PPP packet includes two types, and different types of PPP packets are converted into Ethernet packets in different ways, referring to FIG. 5-2:

1) The PPP packet is an LCP packet. The FlexE shim removes a PPP delimiter and a CRC of the PPP packet, and adds an Ethernet header to obtain the Ethernet packet.

In this case, the FlexE shim sends the Ethernet packet to the switching module so that the switching module forwards the Ethernet packet to a processor according to an ACL rule.

For example, if the PPP header protocol type is other content values such as 0xC021, 0x8021, 0x0023, 0x0281, and 0x003D, all packet contents are reserved, DA, SA, 0X8100, vlan, Ether_TYPE (0x8863), and CRC parts are directly encapsulated into an Ethernet packet and sent to an L2/L3 chip for parsing. This special encapsulated packet on the switching module needs to be matched by configuring the ACL rule and sent to the processor of the CPU.

2) The PPP packet is an IP packet. The FlexE shim removes a PPP delimiter, a PPP header and a CRC of the PPP packet to obtain an IP payload, and adds an Ethernet header to the IP payload to obtain the Ethernet packet.

In this case, the FlexE shim sends the Ethernet packet to the switching module so that the switching module forwards the Ethernet packet to the processor or a FlexE shim corresponding to a port different from the target FlexE port based on a L3 routing table, or the switching module directly sends the Ethernet packet to a FlexE shim corresponding to a port different from the target FlexE port through a target DCN overhead port.

For example, if the PPP header protocol type is 0x0021, it indicates that the PPP packet is an IP packet, 0X7F, 0XFF, 0X03, CRC and 0X7F in the PPP packet are stripped, only a PPP PDU part is reserved, after completing content processing, DA, SA, 0X8100, vlan, Ether_TYPE (0X0800) and CRC parts are encapsulated into a two-layer packet, and the two-layer packet is sent to the switching module for routing processing.

In the embodiments of the present disclosure, all the packets received from the manager channel of each FlexE overhead structure are PPP packets, and the packets are recovered into Ethernet formats by parsing the protocol type of the PPP header, vlan being determined according to a receiving port of the packets. The processing process of the PPP packet in the direction is the inverse process of packet processing in the direction from L2/L3 to FlexE. After the packet conversion processing, a FlexE overhead-based DCN channel is established, and a processor may normally transmit and receive PPP, OSPF and other protocol packets between FlexE ports and generate DCN routing information. At this time, a stable IP connection may be established between devices and between devices and between devices and network managers by using TCP/UDP and other technologies, and the application requirements of network management means such as remote terminal protocol Telnet/ Secure Shell (SSH)/File Transfer Protocol (FTP) may be met.

Figures 1, 6:
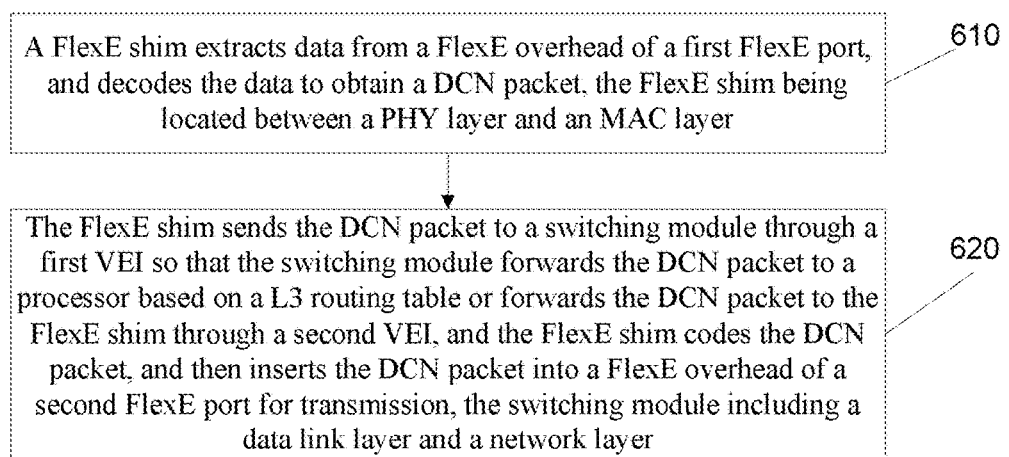
Figures 2, 6:
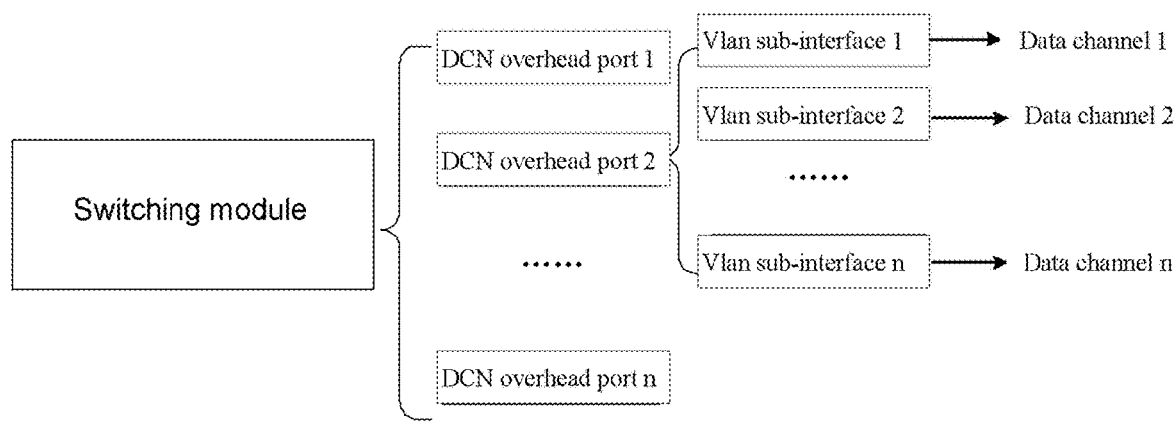

FIG. 6-1 is a schematic flowchart of yet another packet transmission method according to an embodiment of the present disclosure. As shown in FIG. 6-1, the packet transmission method includes step 610 to step 620.

In step 610, a FlexE shim extracts data from a FlexE overhead of a first FlexE port, and decodes the data to obtain a DCN packet, the FlexE shim being located between a PHY layer and an MAC layer.

In step 620, the FlexE shim sends the DCN packet to a switching module through a first VEI so that the switching module forwards the DCN packet to a processor based on a L3 routing table or forwards the DCN packet to the FlexE shim through a second VEI, and the FlexE shim codes the DCN packet, and then inserts the DCN packet into a FlexE overhead of a second FlexE port for transmission, the switching module including a data link layer and a network layer.

In the embodiments of the present disclosure, referring to FIG. 6-2, the switching module includes at least one DCN overhead port, each DCN overhead port includes at least one VLAN sub-interface, different VLAN sub-interfaces correspond to different data channels, and the data channels are DCN channels or client service channels.

When the DCN packet is a first type of DCN packet, the DCN packet is carried on a fixed time slot of the first FlexE port or the second FlexE port, the DCN packet and a client service packet being capable of multiplexing different time slots of one FlexE port, and the DCN packet and the client service packet being distinguished through different VLAN sub-interfaces.

When the DCN packet is a second type of DCN packet, the DCN packet is carried on an IDLE code block or an ERROR code block of a client service time slot of the first FlexE port or the second FlexE port.

Figure 7:
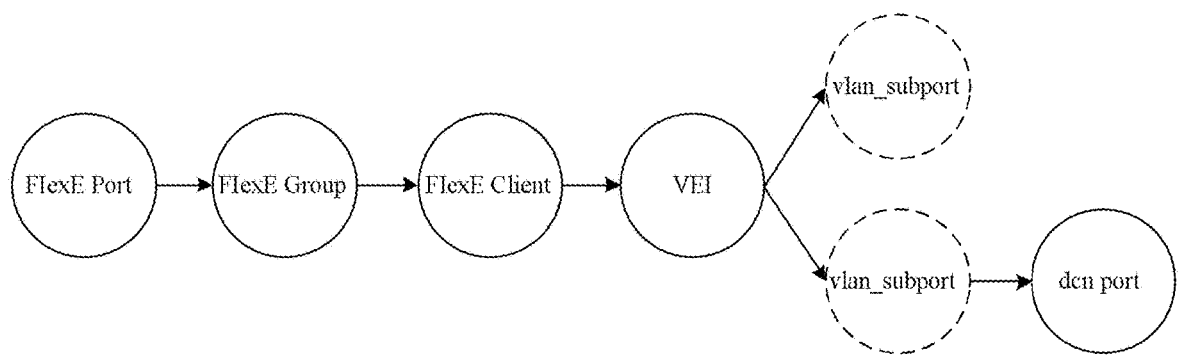
FIG. 7 is a schematic diagram of a FlexE Client-based DCN channel model according to an embodiment of the present disclosure.

The DCN channel model of the technical solution is shown in FIG. 7. The VEI represents a data channel between the internal switching module of the device and the FlexE shim and is used for realizing L2/L3 floor forwarding of FlexE client services on the device. The DCN forwarding technology adopted by the solution may not use a PPP protocol.

After the DCN packet is processed by L2/L3, the DCN packet is uploaded to a local CPU or is finally mapped to a service time slot of a corresponding FlexE port through DCN Clients of other VEIs and sent to a next-hop device.

In the embodiments of the present disclosure, traffic from a DCN of a FlexE port is referred to as a DCN Client as a special FlexE Client. The data flow on DCN Client must be processed by L2/L3 forwarding in every node of a FlexE device network, and cannot be intersected directly at a FlexE Shim layer. After the DCN packet is processed by L2/L3, the DCN packet is uploaded to a local CPU or is finally mapped to a service time slot of a corresponding FlexE port through DCN Clients of other VEIs and sent to a next-hop device.

In the embodiments of the present disclosure, the DCN packet is carried in a control code domain of the IDLE code block or the ERROR code block. 1) The FlexE shim performs 64-bit or 66-bit coding on the DCN packet to obtain a group of 64-bit or 66-bit blocks with formats of a start code block, a data code block and an end code block, and the FlexE shim converts, starting with a start code block of the group of 64-bit or 66-bit blocks, a 66-bit block into a 55-bit block, and inserts the 55-bit block into a control code domain of the IDLE code block or the ERROR code block. 2) The FlexE shim extracts 55-bit data from a control code domain of the IDLE code block or the ERROR code block, performs 64-bit or 66-bit decoding on the 55-bit data, and recovers the decoded data into the DCN packet after decoding an end code block.

DCN Clients support two types: common FlexE Clients and background Clients.

When using a common FlexE Client, it is necessary to allocate a fixed time slot in a FlexE Group for the DCN as a client service. When one FlexE Group corresponds to one 100G FlexE port, one time slot has 5G bandwidth. Generally, the DCN traffic does not need to occupy such a large bandwidth, so the same FlexE Client may be multiplexed with other L2/L3 client traffic. A DCN data flow and an L2/L3 client data flow are distinguished by different VLAN sub-interfaces on an L2/L3 processing module, and the FlexE processing unit does not need to perceive the difference between the two service data flows.

A background client differs from the common FlexE Client in that instead of allocating a fixed service time slot on a FlexE port, a special control C code block 66-bit code block (i.e. an IDLE code block or an ERROR code block) in a service code stream on the port is used to carry DCN data. Even if all 20 time slots are reserved for the client service, there will be an IDLE/ERROR block in a bit stream of the FlexE port as long as the client service rate is not full bandwidth. At this time, the client service on the FlexE port does not need to be processed locally on L2/L3, and FlexE shim layer crossing can be directly performed.

The embodiments of the present disclosure reserve sufficient bandwidth for transmitting DCN traffic in a service time slot by limiting the client access rate. When the user traffic is small, more IDLE code blocks are available, and the available bandwidth of the DCN is larger.

As shown in Table 1, when the DCN packet is carried using the IDLE code block or the ERROR code block, 56 bits of a control code field in the code block are used. The code block type of the bearer context client is distinguished by 1 bit immediately following the block type field: 0 indicates that an ERROR block is used for bearing the background service, and 1 indicates that an IDLE block is used for bearing the background service. The remaining 55 bits carry background traffic.

TABLE 1

| | sync | | | Block payload | | | | | | |
|---|---|---|---|---|---|---|---|---|---|---|
| Block Format | 0 1 | | | 265 | | | | | | |
| Bit position | | | | | | | | | | |
| IDLE | 10 | 0 × 1E | 00 | 00 | 00 | 00 | 00 | 00 | 00 | 00 |

TABLE 1-continued

| | sync | Block payload | | | | | | | | |
|---|---|---|---|---|---|---|---|---|---|---|
| ERROR | 10 | 0 × 1E | 0 × 1E | 0 × 1E | 0 × 1E | 0 × 1E | 0 × 1E | 0 × 1E | 0 × 1E | 0 × 1E |
| DCN | 10 | 0 × 1E | C | | | 55 bits | | | | |

The technical solutions of the embodiments of the present disclosure are described below in connection with application examples.

Example 1

As shown in FIG. 8-1, Device A and Device B are two devices supporting a FlexE technology (referred to as FlexE devices), such as terminals, switches, and routers. Each device has two 100G-rate Ethernet ports (PHY1 and PHY2). Device A and Device B are directly connected through Ethernet port PHY 1. An L2/L3 processing module and a FlexE shim in the device are deployed on two independent hardware chips and are connected through only one physical channel (i.e. a DCN overhead channel).

After Device A is started, a processor on Device A (realized by a CPU) creates two DCN virtual interfaces (DCN1 and DCN2) by default, which correspond to two FlexE ports PHY1 and PHY2 on the FlexE shim one by one. When a DCN packet is transmitted between the L2/L3 switching module and the FlexE shim, sub-interfaces vlan 200 and vlan 201 are respectively used for distinguishing two different DCN channels. A PPP protocol is enabled by default on virtual interface DCN1, and LCP negotiation for PPP is started first. A PPP protocol type field value of an LCP packet is 0xC021. The processing process of the LCP packet is divided into receiving and sending directions. Device B is similar to Device A. After Device B is started, a processor on Device B (realized by a CPU) creates two DCN virtual interfaces (DCN1 and DCN2) by default, which corresponds to two FlexE ports PHY1 and PHY2 on the FlexE shim one by one. When a DCN packet is transmitted between the L2/L3 switching module and the FlexE shim, sub-interfaces vlan 200 and vlan 201 are respectively used for distinguishing two different DCN channels. A PPP protocol is enabled by default on virtual interface DCN1, and LCP negotiation for PPP is started first. A PPP protocol type field value of an LCP packet is 0xC021. The processing process of the LCP packet is divided into receiving and sending directions.

Referring to FIG. 8-2, the sending of LCP packets is processed as follows:

In step 1, a processor performs Ethernet encapsulation on a PPP protocol packet: a source MAC is a local CPU MAC, and a destination MAC is filled in as an MAC address of the FlexE shim. The Ethernet type is filled in as type 0x8863 for Point-to-Point Protocol over Ethernet (PPPoE). According to the foregoing VLAN allocation rule of the DCN channel, a VLAN label 200 is applied to the packet.

In step 2, the processor sends an encapsulated LCP packet to an overhead processing unit (hereinafter simply referred to as a FlexE overhead processing unit) of a FlexE shim through a DCN overhead port of a switching module.

In step 3, the FlexE overhead processing unit judges that an Ethernet packet type is 0x8863, which represents the PPP protocol packet. An Ethernet header is stripped after a VLAN is recorded.

In step 4, the FlexE overhead processing unit encapsulates the PPP packet according to a PPP format, adds an 0x7E identifier and recalculates a CRC, and i data in the PPP packet segment is 0x7E, the data is replaced by 0x7D5D according to a PPP format encapsulation requirement.

In step 5, the FlexE overhead processing unit codes the encapsulated PPP protocol packet according to 64/66B, and inserts the encapsulated PPP protocol packet into Manager channel-section of a FlexE PHY1 port according to the VLAN.

Referring to FIG. 8-2, the receiving of LCP packets is processed as follows:

In step 1, a FlexE overhead processing unit extracts a PPP packet from an overhead of a FlexE port PHY1.

In step 2, the FlexE overhead processing unit determines an LCP packet when a protocol type of the PPP packet is 0xC021, and strips off a PPP delimiter 0x7E and a CRC.

In step 3, the FlexE overhead processing unit encapsulates the PPP packet processed in step 2 with an Ethernet header and then sends the PPP packet to an L2/L3 switching module. In the Ethernet header, a destination MAC and a source MAC are respectively the MAC of a CPU and the MAC of a FlexE shim, and a VLAN is filled in as 200 according to an input interface PHY1 of the packet.

In step 4, the L2/L3 switching module directly extracts the PPP packet encapsulated by the Ethernet according to a packet extraction rule of an ACL and then uploads the PPP packet to a processor of the CPU.

In step 5, the processor identifies a corresponding DCN virtual interface according to a packet receiving port and the VLAN, and carries out PPP protocol processing after stripping off the Ethernet header.

The above process is repeated on the DCN virtual interfaces of a channel directly connecting device A and device B to complete LCP negotiation, and then NCP negotiation is entered. When NCP negotiation is started, the device automatically assigns an IP address to each DCN virtual interface that does not conflict. The PPP protocol type of the NCP packet is 0x8021, and the process of sending and receiving is identical with the LCP.

After the NCP negotiation is successful, a directly connected IP route is created between Device A and Device B, and an OSPF protocol is started on the DCN virtual interface. OSPF packets belong to IP packets, and are processed according to two directions of sending and receiving.

Referring to FIG. 8-3, the sending of IP packets is processed as follows:

In step 1, a processor encapsulates an OSPF packet into an Ethernet header. An Ethernet type is filled into an IP packet type 0x0800, and a VLAN label 200 is applied to the packet.

In step 2, the processor sends an encapsulated IP packet to an overhead processing unit of a FlexE shim through a DCN overhead port of a switching module.

In step 3, the FlexE overhead processing unit judges that an Ethernet packet type is 0x0800, which represents the IP packet. The Ethernet header is stripped after VLAN 200 is recorded.

In step 4, the FlexE overhead processing unit encapsulates an IP payload extracted in step 3 according to a PPP format: adding a 0x7E identifier, adding a PPP header, and recalculating a CRC, where a protocol field type of the PPP header needs to be filled in as 0x0021, which represents IP over PPP. If there is data 0x7E in the IP payload that needs to be 2 byte sequence (7D 5E) according to a PPP encapsulation requirement, 7D transitions to (7D 5D).

In step 5, the FlexE overhead processing unit codes the encapsulated IP over PPP packet according to 64/66B, and inserts the encapsulated packet into manager channel section of a FlexE PHY1 port according to the VLAN.

Referring to FIG. 8-3, the receiving of IP packets is processed as follows:

In step 1, a FlexE overhead processing unit extracts a PPP packet from an overhead of a FlexE port PHY1.

In step 2, the FlexE overhead processing unit determines an IP over PPP packet when a protocol type of the PPP packet is 0x0021, and strips off a PPP delimiter 0x7E, a PPP header and a CRC to obtain an IP payload.

In step 3, the FlexE overhead processing unit adds the IP payload processed in step 2 with an Ethernet header and then sends the PPP packet to an L2/L3 switching module. In the Ethernet header, a destination MAC and a source MAC are respectively the MAC of a CPU and the MAC of a FlexE shim, and a VLAN is filled in as 200 according to an input interface PHY1 of the packet.

In step 4, the L2/L3 switching module performs L3 route lookup table forwarding on the IP packet, and sends the IP packet to a CPU for processing when the IP packet hits a local end of the device.

In step 5, a processor performs protocol processing on a received OSPF packet.

DCN virtual interfaces of a channel directly connecting Device A and Device B complete OSPF neighbor establishment and route learning according to OSPF protocol requirements. The processor issues the learned route of a DCN network to the L2/L3 switching processing module.

Example 2

Figure 9:
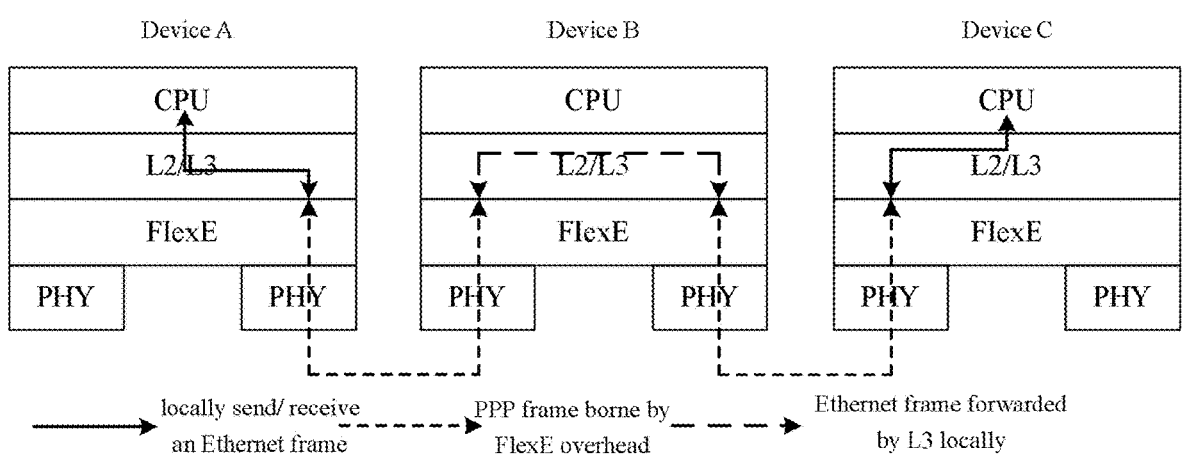
FIG. 9 is a schematic diagram of data transmission among three devices in Example 2 of the present disclosure.

As shown in FIG. 9, in a simple 3-point network of Devices A, B and C, each device supports 2 100G FlexE ports PHY1 and PHY2. Device A and Device B are connected through respective FlexE ports PHY1. Device B and Device C are connected through respective FlexE ports PHY2.

After Devices A, B and C are powered on respectively, a processor on each equipment creates DCN virtual interfaces DCN1 and DCN2 for PHY1 and PHY2 respectively. Through PPP and OSPF negotiation of each DCN virtual interface, an IP routing channel is created among Devices A, B and C.

When Device A sends an IP packet (Internet Control Packets Protocol (ICMP), Telnet, etc.) of which the destination IP is Device C, the forwarding process is as follows:

The processing process of Device A sending an IP packet and Device C receiving the IP packet is the same as the process of sending and receiving an OSPF packet in the embodiments.

Device B forwards the IP packet according to the following steps.

Firstly, an overhead processing module extracts a DCN packet from the overhead of PHY1.

When the IP over PPP with the PPP protocol type of 0021 is identified, the IP over PPP is encapsulated into an Ethernet IP packet, VLAN 200 is used, and the Ethernet IP packet is sent to an L2/L3 switching processing module.

The L2/L3 processing module forwards the IP according to the route, and since the destination IP is Device C, the L2/L3 switching processing module resends the IP packet back to the FlexE overhead processing module, and the VLAN of the packet is modified to 201.

The overhead processing module re-encapsulates the Ethernet packet into an IP over PPP packet, and selects PHY2 according to VLAN 201 to send to Device C.

Example 3

Figure 10:
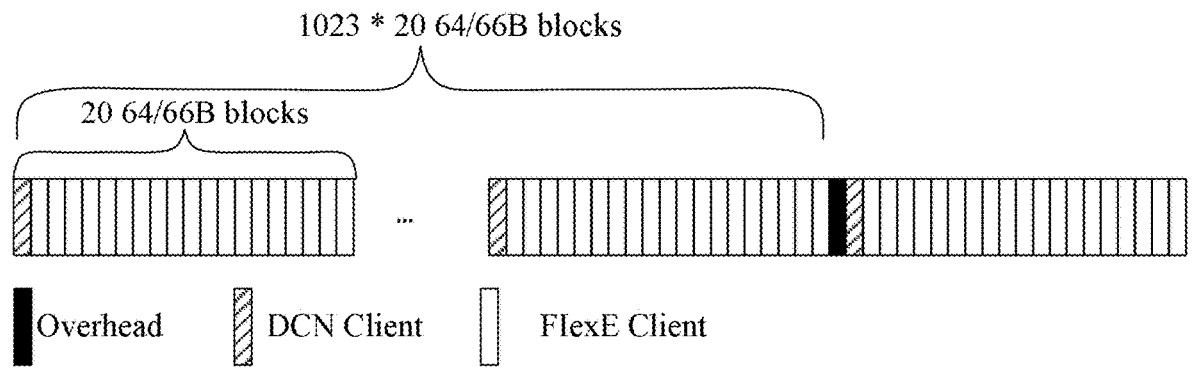
FIG. 10 is a schematic diagram of a data transmission format of a FlexE common client-based DCN channel according to Example 3 of the present disclosure.
Figure 11:
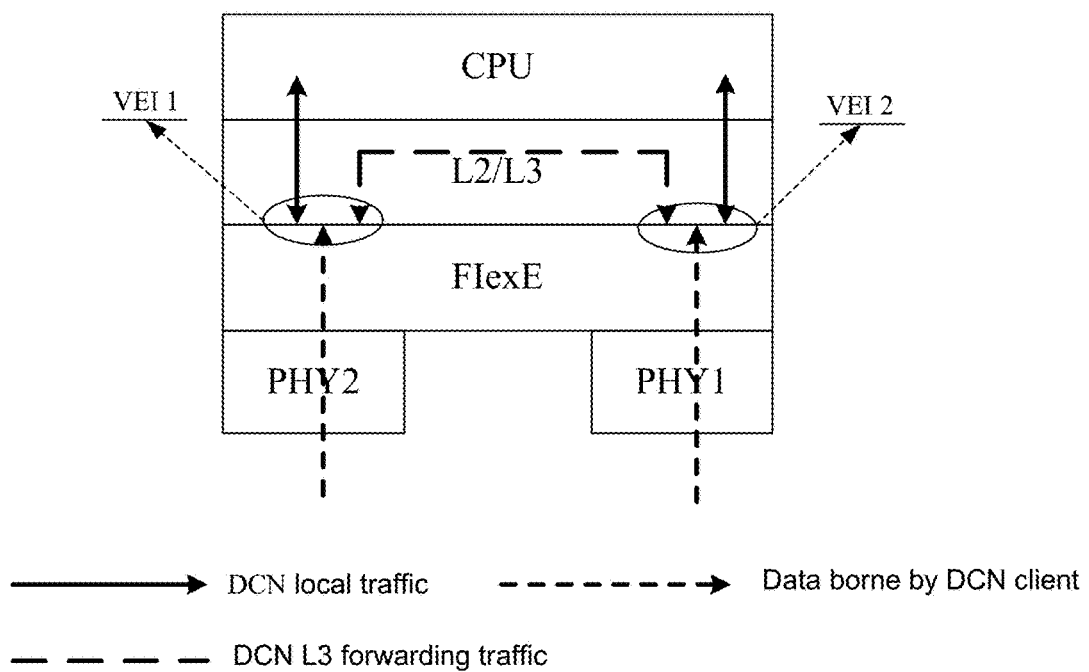
FIG. 11 is a schematic diagram of a FlexE common client-based DCN channel according to Example 3 of the present disclosure.
Figure 12:
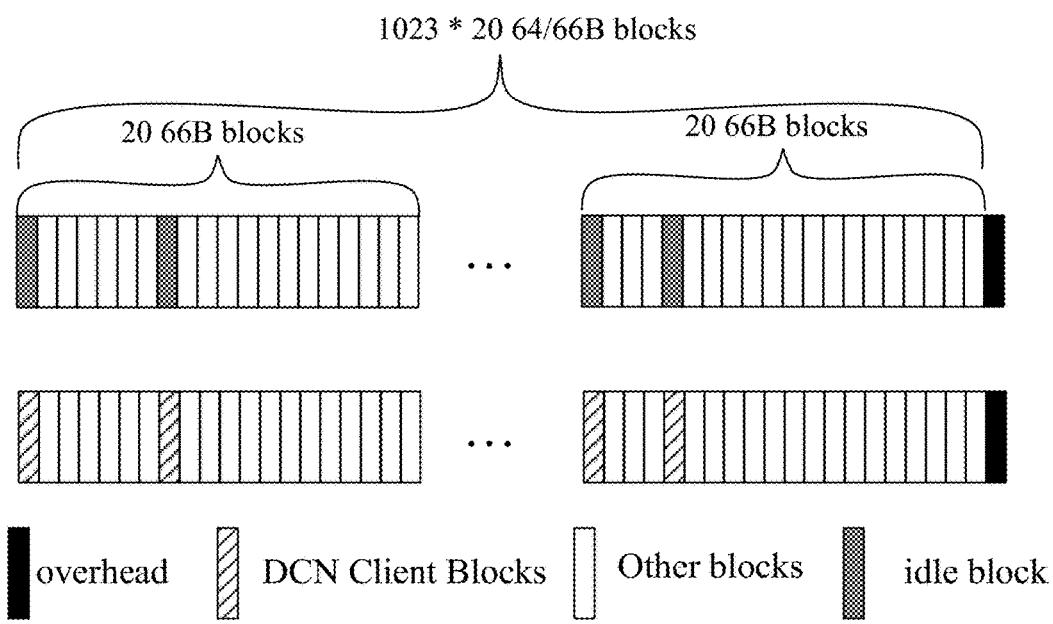
FIG. 12 is a schematic diagram of a data transmission format of a FlexE background client-based DCN channel according to Example 4 of the present disclosure.

Referring to FIG. 10 and FIG. 11, the steps for creating and processing a DCN channel based on a common FlexE client are as follows:

In step 1, two FlexE Groups 1-2 are created and one FlexE port PHY 1-2 is assigned for each FlexE Group.

In step 2, two FlexE Clients 1-2 are created, and bound into two FlexE groups respectively, and a time slot is fixedly allocated on FlexE PHY for each FlexE Client.

In step 3, two VEI objects VEI 1-2 are created, a L3 VLAN sub-interface is created in a switching module for each VEI object, an IP address is configured for the VEI, and network protocols such as PPP and OSPF are started.

In step 4, VEI 1 is bound to FlexE Client 1, and VEI 2 is bound to FlexE Client 2.

Steps 1-4 may be performed by the FlexE device during power-up initialization by the FlexE device. After steps 1-4 are executed, VEI1 and VEI2 are sent to the FlexE Client corresponding to the FlexE shim through the L3 VLAN sub-interface of the switching module. All the traffic received by FlexE Client 1-2 from a designated time slot of FlexE PHY is also sent to the L3 interface corresponding to the L2/L3 processing module for processing. As shown in FIG. 8, for a PPP protocol packet, an ACL rule which is configured in advance is matched and then sent to a processor for protocol processing. For an IP packet, a route lookup table is forwarded and then the IP packet is sent to a local end or sent to other interfaces.

Example 4

Referring to FIG. 12, FIG. 13-1 and FIG. 13-2, the steps for creating a DCN channel based on a FlexE background client are as follows:

In step 1, two FlexE Groups 1-2 are created and one FlexE port PHY 1-2 is assigned for each FlexE.

In step 2, two FlexE Clients 1-2 are created, and bound into two FlexE groups respectively, and FlexE Client 1-2 are set as background clients for FlexE Group, respectively.

In step 3, two VEI objects VEI 1-2 are created, a L3 VLAN sub-interface is created in a switching module for each VEI object, an IP address is configured for the VEI, and network protocols such as PPP and OSPF are started.

In step 4, VEI 1 is bound to FlexE Client 1, and VEI 2 is bound to FlexE Client 2.

Steps 1-4 may be performed by the FlexE device during power-up initialization by the FlexE device. After steps 1-4 are executed, VEI1 and VEI2 are sent to the FlexE Client corresponding to the FlexE shim through the L3 VLAN sub-interface of the switching module. All the traffic received by FlexE Client 1-2 from a designated time slot of FlexE PHY is also sent to the L3 interface corresponding to the L2/L3 processing module for processing. For a PPP protocol packet, an ACL rule which is configured in advance is matched and then sent to a processor for protocol processing. For an IP packet, a route lookup table is forwarded and then the IP packet is sent to a local end or sent to other interfaces.

The process of transmitting packets using the DCN channel of the background client in the processor and the switching module is the same as in Example 3, except for the FlexE shim.

Figures 1, 13:
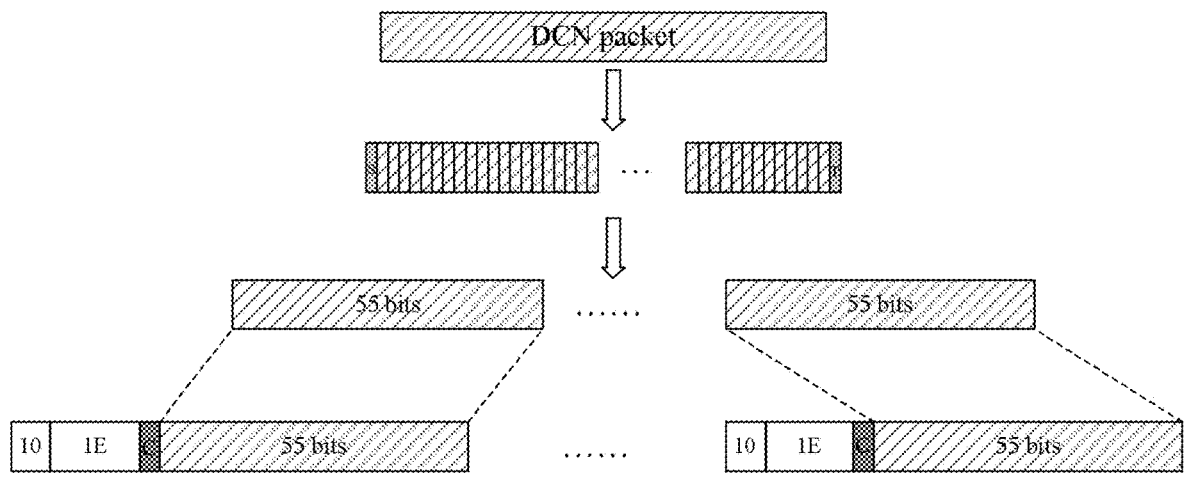
Figures 2, 13:
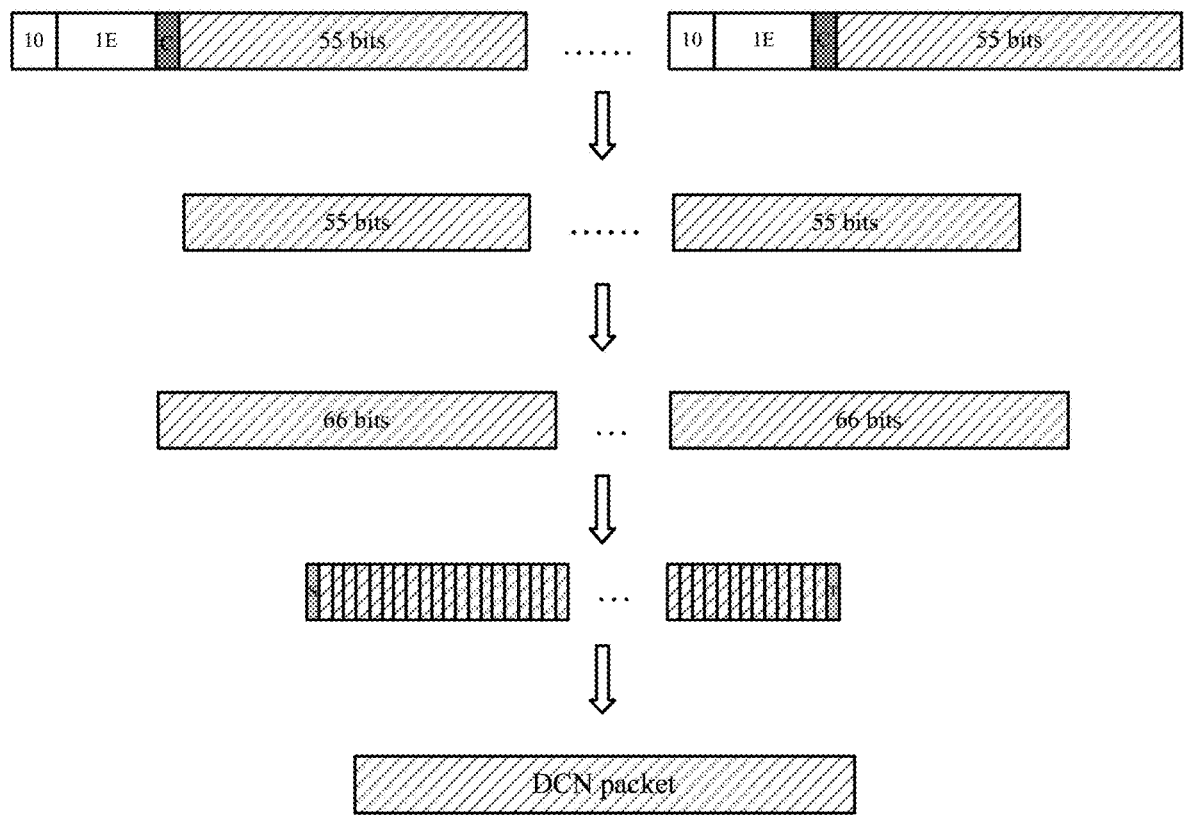

The process in the sending direction is shown in FIG. 13-1: the DCN Client of the FlexE shim performs 64/66B coding on the DCN packet received from the VEI, converts the packet into a bit stream composed of a 64/66B code block sequence in which an S block is used as a start block, multiple data blocks are used as intermediate blocks and a T block is used as an end block; the FlexE shim detects an IDLE code block or an ERROR code block in a service time slot on FlexE PHY in a corresponding FlexE Group: if an IDLE code block exists in a designated client time slot of FlexE PHY, 55 bits are sequentially taken out from the DCN data stream obtained in step 1 and filled in bit 11 to bit 65 in the IDLE code block, and a code block type field (bit 10) of the IDLE code block is set to 1; and if an ERROR code block exists in a designated client time slot of FlexE PHY, 55 bits are sequentially taken out from the DCN data stream obtained in step 1 and filled in bit 11 to bit 65 in the IDLE code block, and a code block type field (bit 10) of the IDLE code block is set to 0. The process of filling 55-bit DCN data into the IDLE or ERROR code block is repeated until the DCN data is completely sent.

The process in the receiving direction is shown in FIG. 13-2: the FlexE shim detects a C code block with a sync mark bit of 1 in a service time slot on FlexE PHY in a corresponding FlexE Group and a code block type of 0x1E; 55 bits of the detected C code block, bit 11-bit 65, are extracted, and the C code block is reduced into an IDLE code block or an ERROR code block according to a bit 10-code block type; and the extracted 55 bits are buffered and restored to a 66B coding format until a complete 66B sequence is detected starting with the S block and ending with the T block. 66B data between the S block and the T block is decoded to obtain a complete DCN Ethernet packet, and the complete DCN Ethernet packet is sent to the switching module.

Figure 14:
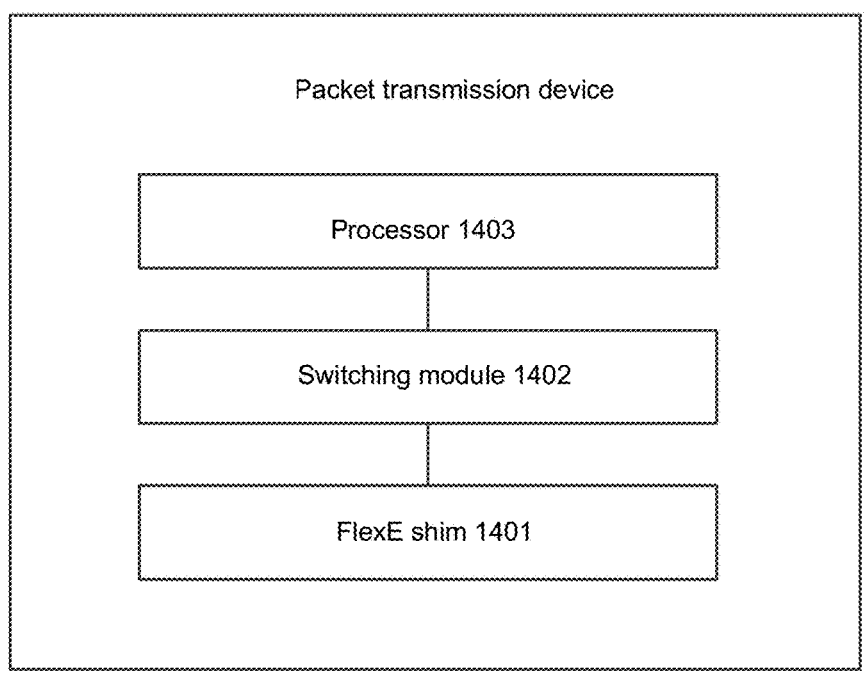
FIG. 14 is a schematic structure composition diagram of another packet transmission device according to an embodiment of the present disclosure.

FIG. 14 is a schematic structure composition diagram of another packet transmission device according to an embodiment of the present disclosure. As shown in FIG. 14, the device includes: a FlexE shim 1401, a switching module 1402 and a processor 1403.

In an implementation mode, the FlexE shim 1401 is configured to receive an Ethernet packet forwarded by the switching module 1402 and sent by the processor 1403, convert the Ethernet packet into a PPP packet, code the PPP packet, and then insert the PPP packet into a FlexE overhead of a target FlexE port for transmission. The FlexE shim is located between a PHY layer and an MAC layer. The switching module 1402 includes a data link layer and a network layer.

The Ethernet packet sent by the processor 1403 is generated in the following manners: acquiring a LCP packet, and encapsulating an Ethernet header outside a PPP header of the LCP packet to obtain the Ethernet packet.

The FlexE shim 1401 is configured to remove the Ethernet header of the Ethernet packet, add a PPP delimiter, and recalculate a CRC to obtain the PPP packet.

The FlexE shim 1401 is configured to receive an Ethernet packet directly forwarded by the switching module 1402 through a target DCN overhead port.

The Ethernet packet sent by the processor is generated in the following manners: acquiring an IP packet, and encapsulating an Ethernet header outside an IP header of the IP packet to obtain the Ethernet packet.

The FlexE shim 1401 is configured to extract an IP payload from the Ethernet packet, add a PPP delimiter and a PPP header to the IP payload, and recalculate a CRC to obtain the PPP packet.

The FlexE shim 1401 is configured to receive an Ethernet packet forwarded by the switching module 1402 based on a L3 routing table, or receive an Ethernet packet directly forwarded by the switching module 1402 through a target DCN overhead port.

The switching module 1402 includes at least one DCN overhead port, each DCN overhead port includes at least one VLAN sub-interface, different VLAN sub-interfaces correspond to different data channels, and the data channels are DCN channels or client service channels.

Correspondingly, the Ethernet packet carries first identification information, the first identification information is at least one of the following: DCN overhead port information and VLAN sub-interface information, and the first identification information is configured to identify a DCN channel corresponding to the Ethernet packet.

The FlexE shim 1401 is further configured to extract the first identification information from the Ethernet packet when the FlexE shim converts the Ethernet packet into a PPP packet.

The FlexE shim 1401 is configured to: determine a DCN channel corresponding to the Ethernet packet according to the first identification information, and determine the target FlexE port according to the DCN channel corresponding to the Ethernet packet; and perform 64-bit or 66-bit coding on the PPP packet, and then insert the PPP packet into a manager channel of the FlexE overhead of the target FlexE port for transmission.

In another implementation mode, the FlexE shim 1401 is configured to extract data from a FlexE overhead of a target FlexE port, decode the data to obtain a PPP packet, convert the PPP packet into an Ethernet packet, and send the Ethernet packet to the switching module 1402, the FlexE shim 1401 being located between a PHY layer and an MAC layer. The switching module 1402 is configured to forward the Ethernet packet to the processor 1403 or a FlexE shim 1401 corresponding to a port different from the target FlexE port. The switching module includes a data link layer and a network layer.

The PPP packet is an LCP packet.

The FlexE shim 1401 is configured to remove a PPP delimiter and a CRC of the PPP packet, and add an Ethernet header to obtain the Ethernet packet.

The FlexE shim 1401 is configured to send the Ethernet packet to the switching module 1402 so that the switching module 1402 forwards the Ethernet packet to the processor 1403 according to an ACL rule.

The PPP packet is an IP packet.

The FlexE shim 1401 is configured to remove a PPP delimiter, a PPP header and a CRC of the PPP packet to obtain an IP payload, and add an Ethernet header to the IP payload to obtain the Ethernet packet.

The FlexE shim 1401 is configured to send the Ethernet packet to the switching module 1402. The switching module 1402 is configured to send the Ethernet packet to the processor 1403 or the FlexE shim 1401 based on a L3 routing table, or the switching module is configured to directly send the Ethernet packet to a FlexE shim corresponding to a port different from the target FlexE port through a target DCN overhead port.

In another implementation mode, the FlexE shim 1401 is configured to extract data from a FlexE overhead of a first FlexE port, decode the data to obtain a DCN packet, and send the DCN packet to the switching module 1402 through a first VET, the FlexE shim being located between a PHY layer and an MAC layer. The switching module 1402 is configured to forward the DCN packet to a CPU based on a L3 routing table or forward the DCN packet to the FlexE shim 1401 through a second VEI. The FlexE shim 1401 is further configured to code the DCN packet, and then insert the DCN packet into a FlexE overhead of a second FlexE port for transmission. The switching module includes a data link layer and a network layer.

The switching module 1402 includes at least one DCN overhead port, each DCN overhead port includes at least one VLAN sub-interface, different VLAN sub-interfaces correspond to different data channels, and the data channels are DCN channels or client service channels.

When the DCN packet is a first type of DCN packet, the DCN packet is carried on a fixed time slot of the first FlexE port or the second FlexE port, the DCN packet and a client service packet being capable of multiplexing different time slots of one FlexE port, and the DCN packet and the client service packet being distinguished through different VLAN sub-interfaces.

When the DCN packet is a second type of DCN packet, the DCN packet is carried on an IDLE code block or an ERROR code block of a client service time slot of the first FlexE port or the second FlexE port. In an embodiment, when the DCN packet is a second type of DCN packet, the DCN packet is carried on a control code domain of an IDLE code block or an ERROR code block of a client service time slot of the first FlexE port or the second FlexE port.

The FlexE shim 1401 is further configured to perform 64-bit or 66-bit coding on the DCN packet to obtain a group of 64-bit or 66-bit blocks with formats of a start code block, a data code block and an end code block, and convert, starting with a start code block of the group of 64-bit or 66-bit blocks, a 66-bit block into a 55-bit block, and insert the 55-bit block into a control code domain of the IDLE code block or the ERROR code block.

The FlexE shim 1401 is further configured to extract 55-bit data from a control code domain of the IDLE code block or the ERROR code block, perform 64-bit or 66-bit decoding on the 55-bit data, and recover the decoded data into the DCN packet when decoding an end code block.

The implementation functions of multiple units in the packet transmission device shown in FIG. 14 may be understood with reference to the related description of the packet transmission device method described above. The functions of multiple units in the packet transmission device shown in FIG. 14 may be implemented by a program running on a processor or by a logic circuit.

When implemented in the form of a software functional module and sold or used as an independent product, the above resource indication device according to the embodiments of the present disclosure may also be stored in a computer-readable storage medium. Based on such understanding, the technical solution of the embodiments of the present disclosure may be embodied in the form of a software product in nature or in part as a contribution to the related art. The computer software product is stored in a storage medium, including a number of instructions for causing a computer device (which may be a personal computer, a computer, a server, or a network device, etc.) to perform all or part the methods described in various embodiments of the present disclosure. The foregoing storage medium includes: a Universal Serial Bus flash disk (U disk), a mobile hard disk, a Read Only Memory (ROM), a magnetic or optical disk, and many other media that may store program code. Thus, the present disclosure is not limited to the combination of specific hardware and software.

Correspondingly, the embodiments of the present disclosure also provide a computer storage medium, having a computer executable instruction stored therein. The computer executable instruction, when executed by a processor, implements the method of the embodiments of the present disclosure.

Figure 15:
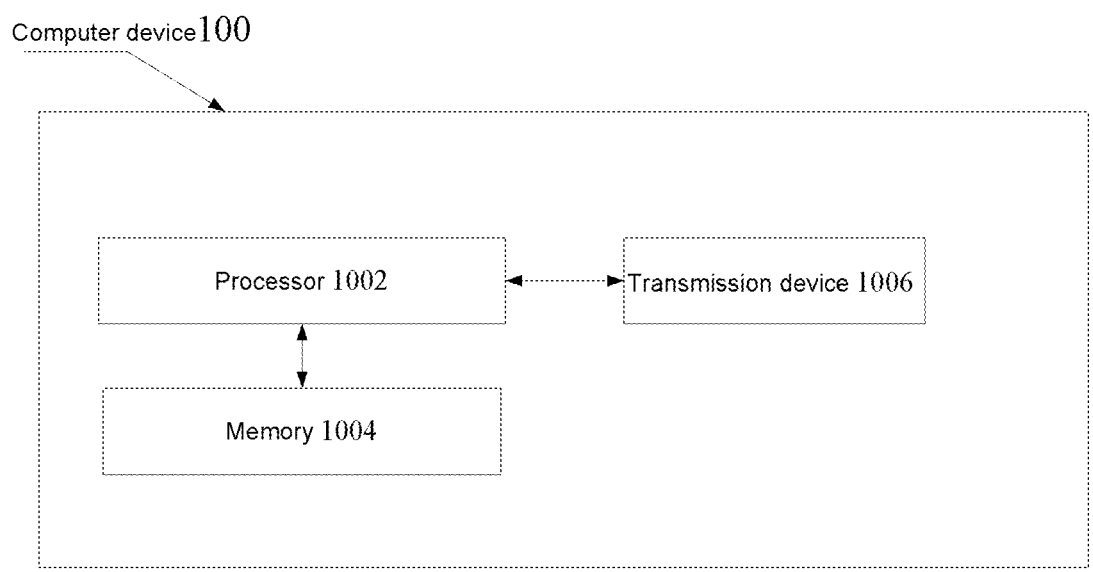
FIG. 15 is a schematic structure composition diagram of a computer device according to an embodiment of the present disclosure.

FIG. 15 is a schematic structure composition diagram of a computer device according to an embodiment of the present disclosure. The computer device is configured to implement the above packet transmission method. As shown in FIG. 15, a computer device 100 may include one or more (only one shown in the figure) processors 1002 (the processor 1002 may include a processing device such as a Micro Controller Unit (MCU) or an FPGA, a memory 1004 configured to store data, and a transmission device 1006 configured for a communication function. The structure shown in FIG. 15 is merely illustrative and does not limit the structure of the above electronic device. For example, the computer device 100 may also include more or fewer components than shown in FIG. 15, or has a different configuration from that shown in FIG. 15.

The memory 1004 may be configured to store a software program and module of application software, such as a program instruction/module corresponding to the method in the embodiments of the present disclosure. The processor 1002 executes various functional applications and data processing, that is, implements the above method by running the software program and module stored in the memory 1004. The memory 1004 may include a high speed random access memory and may also include a non-volatile memory such as one or more magnetic storage devices, a flash memory, or other non-volatile solid state memories. In some examples, the memory 1004 may include memories remotely located relative to the processor 1002, which may be connected to the computer device 100 over a network. The examples of such networks include the Internet, the Intranet, local area networks, mobile communication networks, and combinations thereof.

The transmission device 1006 is configured to receive or send data over a network. The above network examples may include a wireless network provided by a communication provider of the computer device 100. In one example, the transmission device 1006 includes a Network Interface Controller (NIC) that may be connected to other network devices through a base station to communicate with the Internet. In one example, the transmission device 1006 may be a Radio Frequency (RF) module for communicating with the Internet wirelessly.

In some embodiments provided by the present disclosure, the disclosed method and smart device may be implemented in another manner. The device embodiments described above are merely illustrative. For example, the division of the unit is only a logical function division. In actual implementation, there may be another division manner, for example, multiple units or components may be combined or integrated into another system, or some features may be ignored or not executed. In addition, coupling or direct coupling or communication connection displayed or discussed between various components may be indirect coupling or communication connection between devices or units through some interfaces, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment. In addition, multiple functional units in various embodiments of the present disclosure may be all integrated into one second processing unit, or multiple units may be used as one unit separately, or two or more units may be integrated into one unit. The integrated unit may be implemented in the form of hardware or in the form of hardware and software functional units.

What is claimed is:

1. A packet transmission method, comprising:
receiving, by a Flexible-Ethernet (FlexE) shim, an Ethernet packet forwarded by a switching module and sent by a processor, the FlexE shim being located between a Physical (PHY) layer and a Media Access Control (MAC) layer, and the switching module comprising a data link layer and a network layer; and
converting, by the FlexE shim, the Ethernet packet into a Point-to-Point Protocol (PPP) packet, coding the PPP packet, and then inserting the PPP packet into a FlexE overhead of a target FlexE port for transmission.

2. The method according to claim 1, wherein the Ethernet packet sent by the processor is generated in the following manners:
acquiring, by the processor, a Link Control Protocol (LCP) packet, and encapsulating an Ethernet header outside a PPP header of the LCP packet to obtain the Ethernet packet.

3. The method according to claim 2, wherein converting, by the FlexE shim, the Ethernet packet into a PPP packet comprises:
removing, by the FlexE shim, the Ethernet header of the Ethernet packet, adding a PPP delimiter, and recalculating a Cyclic Redundancy Check (CRC) to obtain the PPP packet.

4. The method according to claim 2, wherein receiving, by a FlexE shim, an Ethernet packet forwarded by a switching module and sent by a processor comprises:
receiving, by the FlexE shim, the Ethernet packet directly forwarded by the switching module through a target Data Communicate Network (DCN) overhead port.

5. The method according to claim 1, wherein the Ethernet packet sent by the processor is generated in the following manners:
acquiring, by the processor, an Internet Protocol (IP) packet, and encapsulating an Ethernet header outside an IP header of the IP packet to obtain the Ethernet packet.

6. The method according to claim 5, wherein converting, by the FlexE shim, the Ethernet packet into a PPP packet comprises:
extracting, by the FlexE shim, an IP payload from the Ethernet packet, adding a PPP delimiter and a PPP header to the IP payload, and recalculating a CRC to obtain the PPP packet.

7. The method according to claim 5 or 6, wherein receiving, by a FlexE shim, an Ethernet packet forwarded by a switching module and sent by a processor comprises:
receiving, by the FlexE shim, an Ethernet packet forwarded by the switching module based on a L3 routing table; or,
receiving, by the FlexE shim, an Ethernet packet directly forwarded by the switching module through a target DCN overhead port.

8. The method according to claim 3 or 6, wherein the switching module comprises at least one DCN overhead port, each DCN overhead port comprises at least one Virtual Local Area Network (VLAN) sub-interface, different VLAN sub-interfaces correspond to different data channels, and the data channels are DCN channels or client service channels; and
the Ethernet packet carries first identification information, the first identification information comprising at least one of the following: DCN overhead port information and VLAN sub-interface information, and the first identification information being used to identify a DCN channel corresponding to the Ethernet packet.

9. The method according to claim 8, further comprising:
extracting the first identification information from the Ethernet packet in the case where the FlexE shim converts the Ethernet packet into a PPP packet,
wherein the step of coding the PPP packet and then inserting the PPP packet into a FlexE overhead of a target FlexE port for transmission comprises:
determining, by the FlexE shim, a DCN channel corresponding to the Ethernet packet according to the first identification information, and determining the target FlexE port according to the DCN channel corresponding to the Ethernet packet; and
performing, by the FlexE shim, 64-bit or 66-bit coding on the PPP packet, and then inserting the PPP packet into a manager channel of the FlexE overhead of the target FlexE port for transmission.

10. A packet transmission method, comprising:
extracting, by a Flexible-Ethernet (FlexE) shim, data from a FlexE overhead of a target FlexE port, and decoding the data to obtain a Point-to-Point Protocol (PPP) packet, the FlexE shim being located between a Physical (PHY) layer and a Media Access Control (MAC) layer; and
converting, by the FlexE shim, the PPP packet into an Ethernet packet, and sending the Ethernet packet to a switching module so that the switching module forwards the Ethernet packet to a processor or a FlexE shim corresponding to a port different from the target FlexE port, the switching module comprising a data link layer and a network layer.

11. The method according to claim 10, wherein the PPP packet comprises a Link Control Protocol (LCP) packet;
converting, by the FlexE shim, the PPP packet into an Ethernet packet comprises:
removing, by the FlexE shim, a PPP delimiter and a Cyclic Redundancy Check (CRC) of the PPP packet, and adding an Ethernet header to obtain the Ethernet packet.

12. The method according to claim 11, wherein sending the Ethernet packet to a switching module so that the switching module forwards the Ethernet packet to a processor comprises:
sending, by the FlexE shim, the Ethernet packet to a switching module so that the switching module forwards the Ethernet packet to a processor according to an Access Control List (ACL) rule.

13. The method according to claim 10, wherein the PPP packet comprises an Internet Protocol (IP) packet;
converting, by the FlexE shim, the PPP packet into an Ethernet packet comprises:
removing, by the FlexE shim, a PPP delimiter, a PPP header and a CRC of the PPP packet to obtain an IP payload, and adding an Ethernet header to the IP payload to obtain the Ethernet packet.

14. The method according to claim 13, wherein sending the Ethernet packet to a switching module so that the switching module forwards the Ethernet packet to a processor or a FlexE shim corresponding to a port different from the target FlexE port comprises:

sending, by the FlexE shim, the Ethernet packet to the switching module so that the switching module forwards the Ethernet packet to a processor or a FlexE shim corresponding to a port different from the target FlexE port based on a L3 routing table, or the switching module directly sends the Ethernet packet to a FlexE shim corresponding to a port different from the target FlexE port through a target Data Communicate Network (DCN) overhead port.

15. A packet transmission method, comprising:

extracting, by a Flexible-Ethernet (FlexE) shim, data from a FlexE overhead of a first FlexE port, and decoding the data to obtain a Data Communicate Network (DCN) packet, the FlexE shim being located between a Physical (PHY) layer and a Media Access Control (MAC) layer; and sending, by the FlexE shim, the DCN packet to a switching module through a first Virtual Ethernet Interface (VEI) so that the switching module forwards the DCN packet to a processor based on a L3 routing table or forwards the DCN packet to the FlexE shim through a second VEI, coding, by the FlexE shim, the DCN packet, and then inserting the DCN packet into a FlexE overhead of a second FlexE port for transmission, the switching module comprising a data link layer and a network layer.

16. The method according to claim 15, wherein the switching module comprises at least one DCN overhead port, each DCN overhead port comprises at least one Virtual Local Area Network (VLAN) sub-interface, different VLAN sub-interfaces correspond to different data channels, and the data channels are DCN channels or client service channels.

17. The method according to claim 16, wherein in the case where the DCN packet is a first type of DCN packet, the DCN packet is carried on a fixed time slot of the first FlexE port or the second FlexE port, the DCN packet and a client service packet being capable of multiplexing different time slots of one FlexE port, and the DCN packet and the client service packet being distinguished through different VLAN sub-interfaces; and in the case where the DCN packet is a second type of DCN packet, the DCN packet is carried on an idle character (IDLE) code block or an error (ERROR) code block of a client service time slot of the first FlexE port or the second FlexE port.

18. The method according to claim 16 or 17, wherein in the case where the DCN packet is a second type of DCN packet, the DCN packet is carried on a control code domain of an IDLE code block or an ERROR code block of a client service time slot of the first FlexE port or the second FlexE port.

19. The method according to claim 18, further comprising:

performing, by the FlexE shim, 64-bit or 66-bit coding on the DCN packet to obtain a group of 64-bit or 66-bit blocks with formats of a start code block, a data code block and an end code block; and starting with a start code block of the group of 64-bit or 66-bit blocks, converting, by the FlexE shim, a 66-bit block into a 55-bit block, and inserting the 55-bit block into a control code domain of the IDLE code block or the ERROR code block.

20. The method according to claim 19, further comprising:

extracting, by the FlexE shim, 55-bit data from a control code domain of the IDLE code block or the ERROR code block, performing 64-bit or 66-bit decoding on the 55-bit data, and recovering the decoded data into the DCN packet after decoding an end code block.

\* \* \* \* \*